United States Patent [19]

Miyaki et al.

[11] Patent Number: 4,642,773
[45] Date of Patent: Feb. 10, 1987

[54] METHOD AND APPARATUS FOR CONTROLLING AN ENGINE

[75] Inventors: Masahiko Miyaki, Oobu; Tsuneyuki Egami, Aichi, both of Japan

[73] Assignees: Nippondenso Co., Ltd., Kariya; Nippon Soken, Inc., Nishio, both of Japan

[21] Appl. No.: 628,370

[22] Filed: Jul. 6, 1984

[30] Foreign Application Priority Data

Jul. 8, 1983 [JP] Japan ............................ 58-125154

[51] Int. Cl.⁴ ..................... F02D 5/02; G05B 15/02
[52] U.S. Cl. .................... 364/431.05; 123/501
[58] Field of Search ............ 364/431.03, 431.04, 364/431.05, 431.11; 123/357, 501, 502

[56] References Cited

U.S. PATENT DOCUMENTS

| | | | |
|---|---|---|---|
| 4,354,239 | 10/1982 | Kanegae | 364/431.05 |
| 4,368,705 | 1/1983 | Stevenson et al. | 123/501 |
| 4,387,429 | 6/1983 | Yamaguchi et al. | 364/431.05 |
| 4,438,496 | 3/1984 | Ohie | 364/431.05 |
| 4,450,817 | 5/1984 | Ibuki et al. | 123/501 |
| 4,561,056 | 12/1985 | Hirayama et al. | 364/431.11 |

FOREIGN PATENT DOCUMENTS 5134936 9/1976 Japan.

Primary Examiner—Parshotam S. Lall
Attorney, Agent, or Firm—Cushman, Darby & Cushman

[57] ABSTRACT

A control signal is generated to actuate a solenoid-operated valve at an angle phase of rotation of an engine for cutting off a fuel supply to an engine cylinder. The control signal is determined by a reference angle signal produced at a reference angle of rotation of the engine, and a rotational angle signal produced for each crank angle. Rotational angle signals are counted which are produced after each reference angle signal before the angle phase is reached with any remainder angle smaller than the crank angle. The remainder angle is converted into a time based on an average number of r.p.m. of the engine at the time the conversion is effected. The control signal is issued upon elapse of the counted rotational angle signals and the converted time. A ratio of an instantaneous number of r.p.m. of the engine in the vicinity of the angle phase to an average number of r.p.m. of the engine is issued and used for correcting the time converted from the remainder angle with the ratio.

7 Claims, 26 Drawing Figures

METHOD AND APPARATUS FOR CONTROLLING AN ENGINE

BACKGROUND OF THE INVENTION

The present invention relates to a method of and an apparatus for controlling an engine to produce an engine output at a desired rotational angle of the engine such as in fuel injection control or ignition timing control.

There is known a computer-operated fuel injection control system incorporating a solenoid-operated valve for spilling a metered quantity of fuel to a diesel engine according to the control method of the type described above. The fuel injection control system is supplied with a reference signal G each time the engine crank shaft rotates through 180° (crank angle=CA) and an angle signal N for each $\theta o \times CA$. If it is desired to energize the solenoid-operated valve (that is, to comlete fuel injection) after $\theta$ from the reference signal, then the computer determines $\theta/\theta o = k$ with a remainder $\theta h$, then calculates $h = (1/\overline{N}) \times (\theta h/360)$ from an average value $\overline{N}$ of rotational angle signals N, and energizes the solenoid-operated spill valve upon elapse of a time h after k rotational angle signals N have been generated. The angles of rotation of the crank shaft are counted by a finite number of signals N which are converted into a time, and an angle smaller than an interval between adjacent signals N is converted into a time based on the number of r.p.m. of the engine at the time.

The prior fuel injection control system would suffer no problem if the engine rotation were smooth and has no variations. However, the engine is actually subjected to rotational variations or irregularities in its one cycle of operation due to different engine strokes such as compression and explosion strokes. If there is any difference between the average number of r.p.m. $\overline{N}$ and the number of r.p.m. Nx at the time angle-to-time conversion is effected, then the time h will contain an error.

SUMMARY OF THE INVENTION

It is an object of the present invention to provide an engine control method capable of reducing any error caused in angle-to-time conversion by correcting a time h, as defined above, with a ratio of change of engine rotation determined from an average number of r.p.m. $\overline{N}$ of the engine and an instantaneous number of r.p.m. Nx of the engine in the vicinity of a phase angle at which a control unit or computer is to issue a control output signal.

Another object of the present invention is to provide an engine control apparatus for carrying out the above engine control method.

According to the present invention, a control signal is generated to actuate a solenoid-operated valve at a angle phase of rotation of an engine for cutting off a fuel supply to an engine cylinder. The control signal is determined by a reference angle signal produced at a reference angle of rotation of the engine, and a rotational angle signal produced for each crank angle. Rotational angle signals are counted which are produced after each reference angle signal before the angle phase is reached with any remainder angle smaller than the crank angle. The remainder angle is converted into a time based on an average number of r.p.m. of the engine at the time the conversion is effected. The control signal is issued upon elapse of the counted rotational angle signals and the converted time. A ratio of an instantaneous number of r.p.m. of the engine in the vicinity of the angle phase to an average number of r.p.m. of the engine is issued and used for correcting the time converted from the remainder angle with the ratio.

With such an arrangement, the conversion of the remainder angle into the time is not subjected to significant errors when the engine rotation undergoes variations or irregularities due to different engine strokes such as compression and explostion. The engine can therefore be controlled with high accuracy.

BRIEF DESCRIPTION OF THE DRAWINGS

The present invention will be described in detail by way of illustrative example with reference to the accompanying drawings, in which;

FIGS. 8A, 8B and 9 are flowcharts illustrating successive steps of the control method of the present invention;

DETAILED DESCRIPTION

Figure 1:
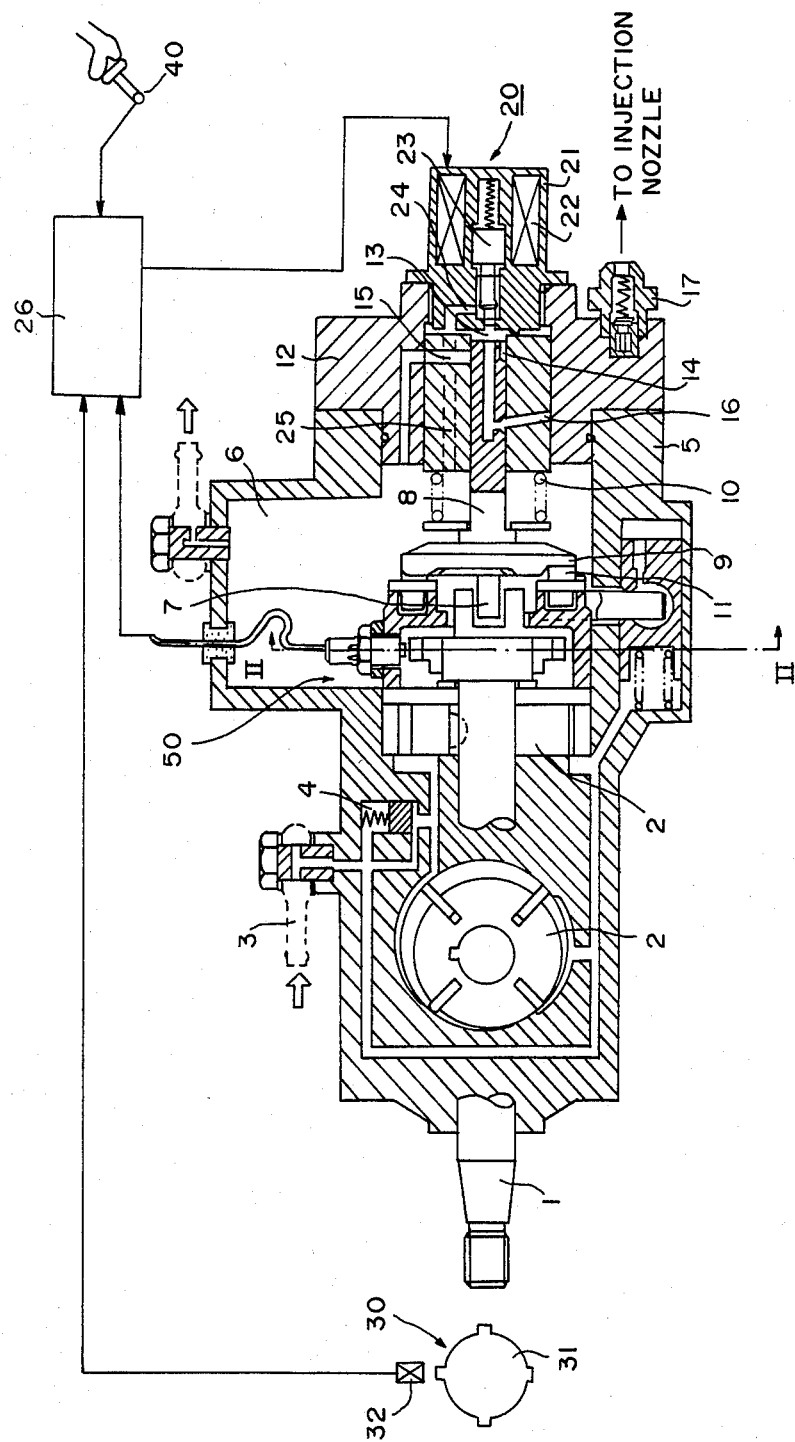
FIG. 1 is a cross-sectional view of a diesel engine fuel injection control system to which the present invention is applicable.

FIG. 1 illustrates a diesel engine fuel injection control system to which the present invention is applicable, the fuel injection control system having a solenoid-operated valve for spilling a metered quantity of fuel. The fuel injection control system has a drive shaft 1 driven by a diesel engine (not shown) for rotating a vane feed pump 2. The vane feed pump 2 introduces fuel from a fuel supply port 3 and pressurizes the fuel under a certain pressure through a fuel pressure regulator valve 4, from which the fuel is supplied under pressure into a fuel chamber 6 defined in a pump housing 5. The drive shaft 1 also drives a pressure-feed plunger 8 through a coupling 7 which causes the plunger 8 to rotate therewith but allows the plunger 8 to move freely axially. The pressure-feed plunger 8 has an integral face cam 9 pressed resiliently against cam rollers 11 under the force of a spring 10. The cam rollers 11 and the cam face 9 jointly constitute a known mechanism for converting the rotation of the drive shaft 1 into reciprocating movement of the plunger 8 in the axial direction. The converting mechanism is constructed such that the plunger 8 makes as many reciprocating movements as there are engine cylinders in one rotation of the plunger as cam projections of the cam face 9 ride over the cam rollers 11. The pressure-feed plunger 8 has a portion fitted in a head 12 fixed to the pump housing 5, defining a pump chamber 13 in the head 12. The pressure-feed plunger 8 has a plurality of fuel inlet slots 14 in an outer peripheral surface thereof, opening into the pump chamber 13. When one of the fuel inlet slots 14 communicates with an fuel inlet port 15 connected to the fuel chamber 6 in an intake stroke of the plunger 8, fuel is introduced from the fuel chamber 6 into the pump chamber 13. When the fuel in the pump chamber 13 is compressed in a compression stroke of the plunger 8, the fuel is fed from distribution ports 16 through pressure-feed valves 17 to fuel injection valves (not shown) from which the fuel is injected into the engine cylinders, respectively.

The pump chamber 13 is combined with a fuel metering mechanism 20 having a solenoid-operated valve 21 including a coil 22 and a needle valve 23. When a current is passed through the coil 22, the needle valve 23 is lifted off its valve seat to allow fuel to return from the pump chamber 13 under high pressure through spill passages 24, 25 into the fuel chamber 6. Accordingly, fuel injection is interrupted when the solenoid-operated valve 21 is actuated in the compression stroke of the pressure-feed plunger 8. The timing at which the solenoid-operated valve 21 is energized is determined by an electronic control unit or microcomputer 26. The electronic control unit 26 is supplied with signals from various engine sensors, such as engine condition signals from an engine rotation sensor 30, an accelerator pedal sensor 40, and a temperature sensor (not shown), and a signal from a rotational angel sensor 50, for controlling energization of the fuel-metering solenoid-operated valve 21 based on a control program described later on.

The engine rotation sensor 30 comprises a disk 31 mounted on an engine cam shaft (not shown), for example, which rotates in unison with the pump drive shaft 1 in phasse therewith and has four angularly equally spaced peripheral projections, for example, for a four-cylinder engine, and a proximity detector 32 comprising a known electromagnetic pickup. The engine rotation sensor 30 serves to sense the number of r.p.m. of the engine and also as a reference angle sensor which produces an output at a predetermined crank angle phase.

Figure 2:
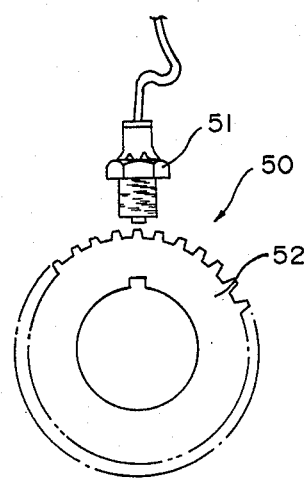
FIG. 2 is a cross-sectional view taken along line II—II, showing a rotational angle sensor.

As shown in FIG. 2, the rotational angle sensor 50 comprises a disk 51 mounted for corotation on the pump drive shaft 1 and having a plurality of peripheral teeth, and a proximity detector 52 which is of the same construction as that of the proximity detector 32. The rotational angle sensor 50 produces one output signal each time the pump drive shaft 1 rotates about its own axis through a given angle, that is, in each prescribed angle of rotation of an engine crank shaft (not shown). In the illustrated embodiment, the disk 31 has 32 peripheral teeth and the rotational angle sensor 50 produces 32/2 output signals, or one output signal in each angle of 360/16=22.5°.

The accelerator pedal sensor 40 comprises a known potentiometer for sending information on an engine load demanded by the driver to the control unit 26.

Based on the foregoing arrangement shown in FIGS. 1 and 2, an engine control method serving as the basis of the present invention will be described with reference to FIGS. 3 through 5.

Figure 3:
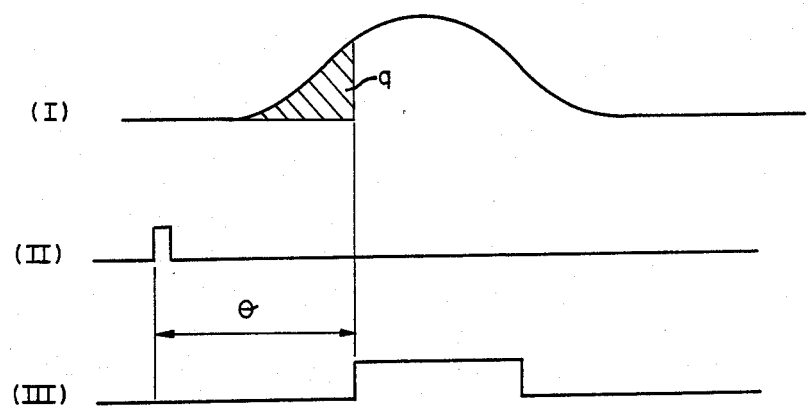
FIGS. 3(I, II, III) and 4(I, II, II, III) are timing charts showing the principal concept of metering an amount of fuel to be injected.
Figure 4:
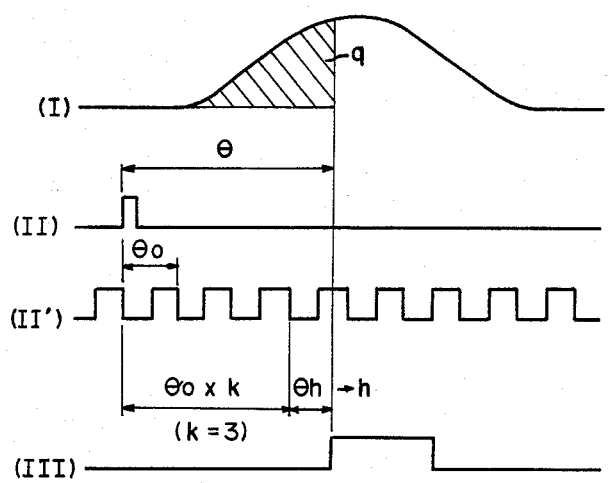

FIG. 3 is a diagram showing timing charts, the timing chart (I) being indicative of the distance the plunger of the pump is lifted, the timing chart (II) of an output signal produced from the reference angle sensor at a given angle phase of the engine or the injection pump, and the timing chart (III) of a pulse signal for energizing the fuel-metering solenoid-operated valve 21. The microcomputer 26 is responsive to load information from the rotation sensor 30, the accelerator pedal sensor 40, and the non-illustrated temperature and pressure sensors for determining a quantity of fuel q to be injected and starting to energize the solenoid-operated valve 20 after a rotational angle to start spilling the fuel, corresponding to the fuel quantity to be injected, or after $\theta$o CA from the reference angle. It is necessary that the solenoid-operated valve 21 be closed in readiness for a next fuel injection cycle while the plunger 8 is in an intake stroke. The solenoid-operated valve 21 should be closed while the plunger 8 is in its intake stroke, and the accuracy requirement for the valve closing timing may be much lower than that for the valve opening timing.

The timing $\theta$o CA for opening the solenoid-operated valve is required to be controlled highly accurately since it is an important parameter directly related to the quantity of fuel to be injected. The desired accuracy of the timing $\theta$o CA could be achieved by a rotational angle sensor having an infinitely high resolution. However, the present state of the art is such that a desired accuracy of timing has to be achieved by using a finite number of rotational angle sensor signals and a time counter contained in a control microcomputer. Such a control process will be described with reference to FIGS. 4 and 5. FIG. 4 illustrates a plunger lift (I), a reference angle sensor signal (II), a pulse signal applied to the solenoid-operated valve (III), as in FIG. 3, and a signal (II') from the rotational angle sensor 50 (FIG. 1). As described above, the rotational angle sensor 50 is arranged to produce 32/2=16 signals for each 360° CA, and hence one period $\theta$o of the rotational angle sensor signal is equal to 360° CA/16=22.5° CA.

In the above control process, an angle $\theta$ determined by the required fuel quantity q is divided by $\theta$o to find a quotinent k (an integer) and a remainder $\theta$h. Therefore, an interval corresponding to $\theta$o×k° CA can correctly be determined as an angle signal, but the remainder $\theta$h smaller than the minimum resolution $\theta$o of the angle signal cannot be handled as such an angle signal, and should be converted into a time corresponding to $\theta$h based on the number of r.p.m. of the engine at the time. A command is given to open the solenoid-operated valve after k rotational angle sensor signals have been generated and further the time h corresponding to $\theta$h has elapsed after the reference angle signal (II).

Figure 5:
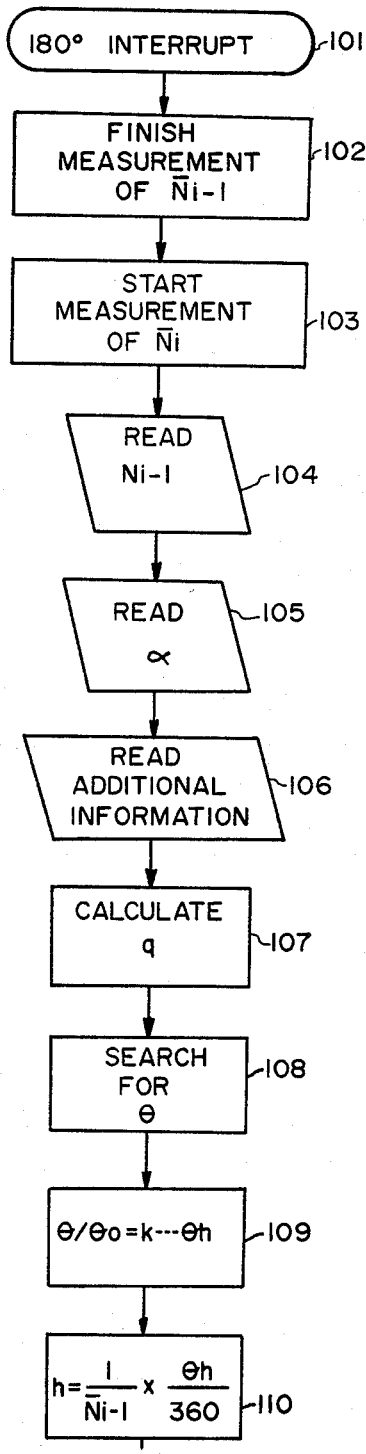
FIG. 5 is a flowchart of successively steps for effecting a fuel injection control method as shown in FIG. 4.

FIG. 5 is a flowchart of successive steps of the above control effected by the microcomputer 26. The control process is effected each time the reference angle sensor signal is applied, that is, the microcomputer 26 enters the control process on an interrupt for each 180° CA. The interrupt process starts in a step 101, and the measurement of the number of r.p.m. of the engine which has been effected from a previous 180° CA interrupt is completed to determine an average number of r.p.m. $\overline{N}i-1$ in a step 102. Then, the number of r.p.m. starts to be measured to determine a present average number of r.p.m. $\overline{N}i$ in a step 103. More specifically, the number of r.p.m. of the engine is determined as an average number of r.p.m. between adjacent 180° CAs. This can provide a proper average number of r.p.m. since the cyclic period of rotational variations or irregularities due to a transition from the compression to explosion strokes is 180° CA. The average number of r.p.m. $\overline{N}i-1$, an accelerator pedal depression or throttle opening $\alpha$, and additional information such as the temperature of engine cooling water are read in steps 104, 105, 106, respectively. Based on these items of information, the microcomputer 26 calculates a quantity of fuel q required by the engine in a step 107. In a next step 108, the microcomputer 26 searches a map, for example, stored in a memory for an angle $\theta$ at which the solenoid-operated valve is to be opened, the angle corresponding to the fuel quantity q which has been determined. The angle is divided by the period $\theta o$ of the rotational angle sesnor signal to find a quotient k and a remainder h in a step 109, and then the time h corresponding to the remainder $\theta h$ CA is calculated in a step 110 according to the equation $h=(1/\overline{N}i-1)\times(\theta h/360)$ based on the average number of r.p.m. $\overline{N}i-1$ which has been read in the step 104. The program now leaves the interrupt routine for each 180° CA. The data items k and h thus determined are set in an output control unit of the microcomputer 26, which opens the solenoid-operated valve upon elapse of k rotational angle sensor signals and the time h after the reference angle sensor signal.

Figure 6:
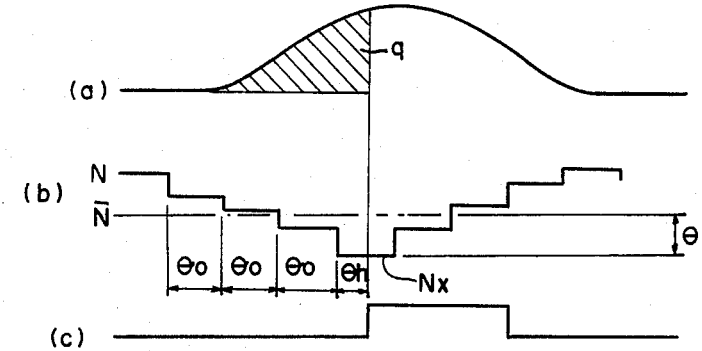
FIGS. 6(a, b, c) are timing charts illustrative of a problem with the fuel injection control method of FIG. 4.

A problem with the above fuel metering system will be described with reference to FIG. 6. If the speed of engine rotation were completely smooth without any irregularities and an average number of r.p.m. N were kept at all times, no problem would arise. However, any reciprocating engines are actually subjected to rotational variations or irregularities as the engine goes through a transision from compression and explosion strokes. Such a rotational variation is shown in FIG. 6 by the solid line at (b). The fuel is normally injected in an engine stroke immediately prior to the top dead center of a compression stroke. Generally, the speed of rotation of the engine is most reduced at a phase corresponding to the remainder $\theta h$. Therefore, there is a large difference e between the instantaneous number of r.p.m. Nx at such a phase and the average number of r.p.m. $\overline{N}$. If the fuel control process is effected according to the program shown in FIG. 5, then the rotation angle corresponding to the time h is smaller than the proper angle $\theta h$ required since the difference e is completely neglected. The fuel is therefore spilled by the solenoid-operated valve too early as indicated at (c) in FIG. 6, and the actual quantity of fuel injected into the engine cylinder is smaller than the required fuel quantity.

Figure 7:
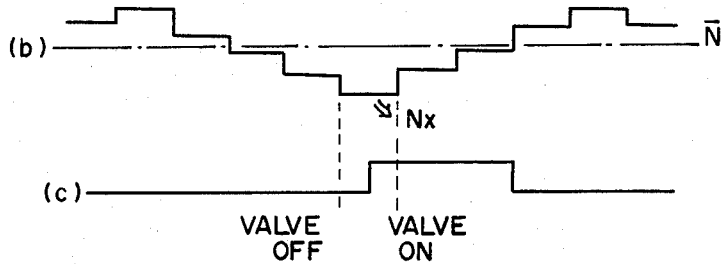
FIGS. 7(b, c) are timing charts showing the concept of a control method according to the present invention.

The present invention has been made in view of the above drawback. According to the present invention, the relationship between the average number of r.p.m. $\overline{N}$ and the instantaneous number of r.p.m. Nx at the timing where the solenoid-operated valve is actuated, or the remainder angle $\theta h$ is converted into the time h, is established as shown in FIG. 7 at (b) and (c), and based on such relationship the conversion of the remainder angle $\theta h$ into the time h is corrected for enabling the control unit to issue a desired valve control signal always at a correct phase even if there are rotational irregularities due to different strokes of a reciprocating engine.

Figure 8B:
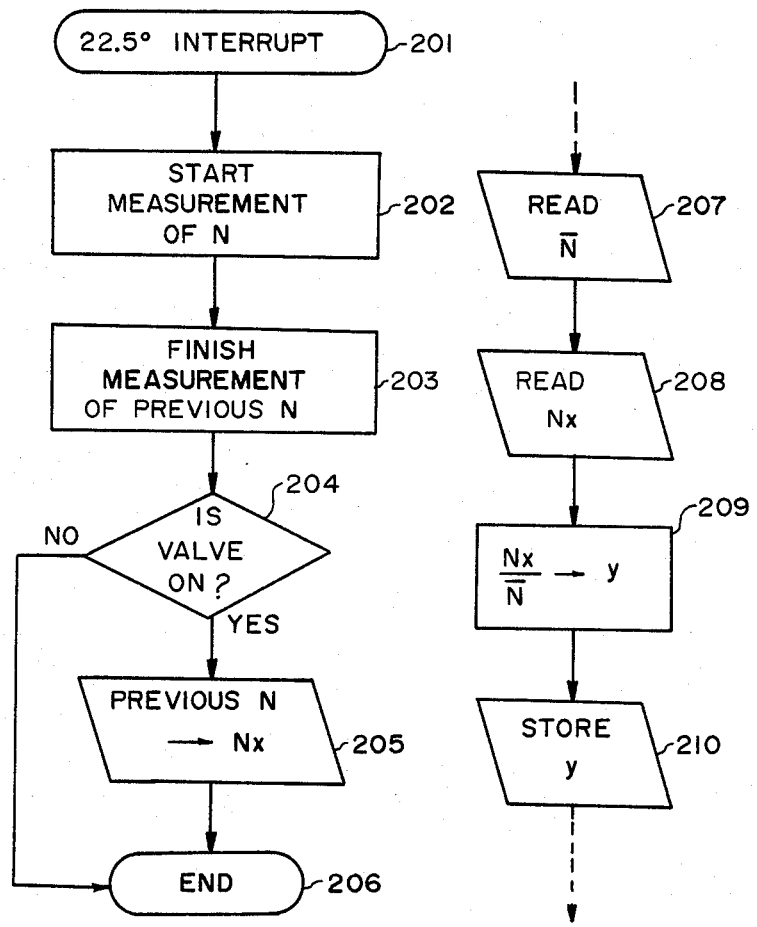

An engine control process according to the present invention will be described in greater detail with reference to FIGS. 8A through 8C and 9. The fuel injection control mechanism used for the engine control process of the invention is the same as that shown in FIGS. 1 and 2. The present invention resides in a new control process carried out in the control unit or microcomputer 26 shown in FIG. 1. FIG. 8A is a flowchart of steps of an interrupt process effected each time an input signal is applied from the rotational angle sensor, that is, for each 22.5° CA. After the interrupt process is started for each 22.5° CA in a step 201, a present instantaneous number of r.p.m. of the engine is measured between adjacent 22.5° CA in a step 202, and the measurement of a previous instantaneous number of r.p.m. of the engine between adjacent 22.5° CA is completed in a step 203. Then, a step 204 determines whether a pulse signal is applied to the solenoid-operated valve between the previous and present interrupt processes. If the solenoid-operated valve is actuated, then the previous instantaneous number of r.p.m. between adjacent 22.5° CAs is stored as an instantaneous number of r.p.m. Nx at the phase corresponding to the remainder angle h at which time fuel is to be spilled through the solenoid-operated valve. Then, the interrupt process is finished.

Figure 8C:
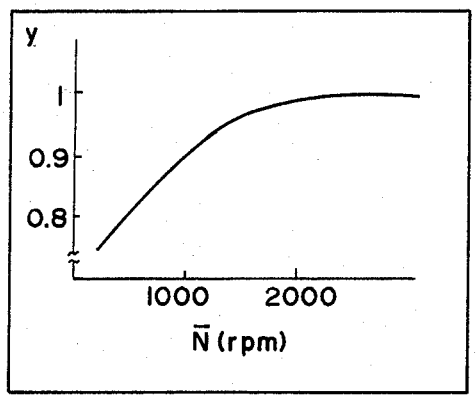
FIG. 8C is a diagram showing the relationship between a speed reduction ratio and an average number of r.p.m. of the engine.

FIG. 8B shows another process beginning with a step 207, which should be included in a main routine or a 180° interrupt routine (described later). In this process, the average number of r.p.m. N of the engine between adjacent 180° CAs is read in a step 207, and the instantaneous number of r.p.m. Nx that has been stored in the step 205 is read in a step 208. Thereafter, a step 209 determines the ratio of Nx to $\overline{N}$, that is, the ratio of a reduction in the rotational speed Nx/$\overline{N}$=y. This speed reduction ratio is then expressed as a map X plotted as against the average number of r.p.m. $\overline{N}$ and stored as a look-up table in a memory in a step 210. In general, when the average number of r.p.m. is high, the speed reduction ratio y approaches 1 due to an increasing moment of inertia of the engine, as shown in FIG. 8C. Although it is enough for the speed reduction ratio y to be plotted as a look-up table against the average number of r.p.m. of the engine, an engine load may also be included as another parameter in a two-dimensional look-up table.

The speed reduction ratio y should preferably be stored in a memory device such as a known nonvolatile RAM in which data can be rewritten and remain stored even upon a power failure. However, the speed reduction ratio y may be stored in a volatile RAM or may be simply stored, rather than being plotted as a look-up table, for use in a next conversion from $\theta h$ into h. Where the speed reduction ratio at the time the fuel is spilled through the solenoid-operated valve is known in advance from the characteristics of the engine and fuel injection system, it is not necessary to effect the steps 201 through 210, but the speed reduction ratio y may be stored in a ROM.

Figure 9:
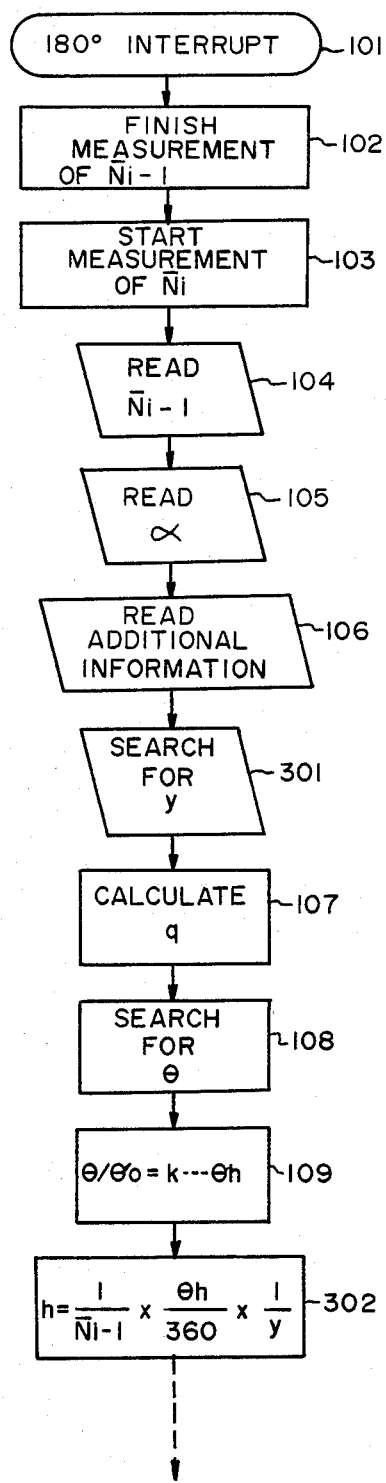

FIG. 9 illustrates a process for correcting an angle at which to open the solenoid-operated valve using the speed reduction ratio y. The process of FIG. 9 differs from the process of FIG. 5 in that it includes two additional steps 301, 302. In a step 301, a speed reduction ratio y expected at the time the solenoid-operated valve is to be opened this time is read in addition to the other items of information, and in a step 302, the conversion of the remainder angle h into the time h is corrected on the basis of the speed reduction ratio y according to $h=(1/\overline{N}i-1)\times(\theta h/360)\times 1/y$. The fuel control process of FIG. 9 is capable of controling fuel injection properly even under rotational variations or irregularities of the engine.

In case the 22.5° interrupt process is difficult to achieve due to high speed rotation of the engine, this interrupt process may be cancelled beyond a certain speed of engine rotation such as $\overline{N}=2000$ r.p.m. to reduce the burden on the microcomputer since rotational variations or irregularities of the engine are mainly problematic in a low speed range, but cause no serious shortcoming in a high speed range.

Figure 10:
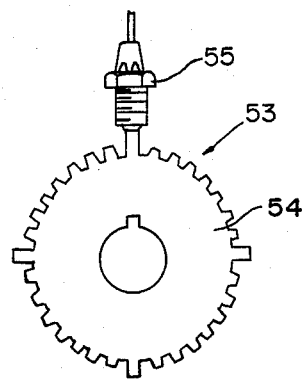
FIG. 10 is a side elevational view of a rotational angle sensor according to another embodiment of the present invention.
Figure 11:
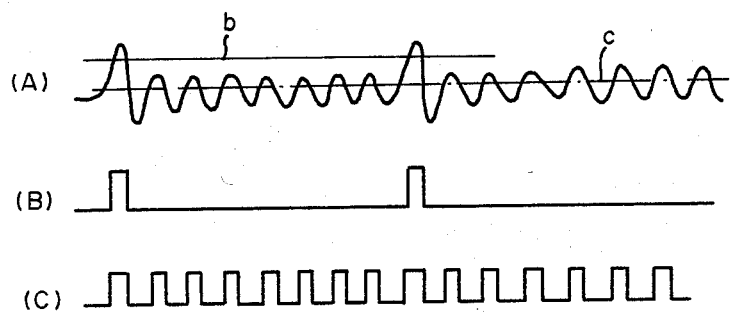
FIGS. 11(A, B, C) are diagrams showing the waveform of a signal generated by the rotational angle sensor shown in FIG. 10 and waveforms derived therefrom.

FIG. 10 illustrates a rotational angle sensor according to another embodiment of the present invention. The rotational angle sensor, generally designated at 53, may be positioned in place of the rotational angle sensor 50 in FIG. 1, and comprises a disk 54 having teeth on its outer peripheral edge and a proximity detector 55. The teeth on the disk 54 include four larger teeth which are circumferentially spaced 90°. The rotational angle sensor 53 issues a signal having a waveform as shown in FIG. 11 at (A) to the microcomputer. The signal is then divided into two difference signals having waveforms as illustrated iN FIG. 11 at (B) and (c), respectively, using two different threshold levels a, b shown at (A) in FIG. 11. The signal (B) serves as a reference signal generated each time the disk 54 rotates through 90° or for each 180° CA of the pump. The signal (C) serves as a rotational angle signal gerated for each 22.5° CA. With the rotational angle sensor 53 used, the reference angle sensor 30 shown in FIG. 1 may be omitted.

Figure 12:
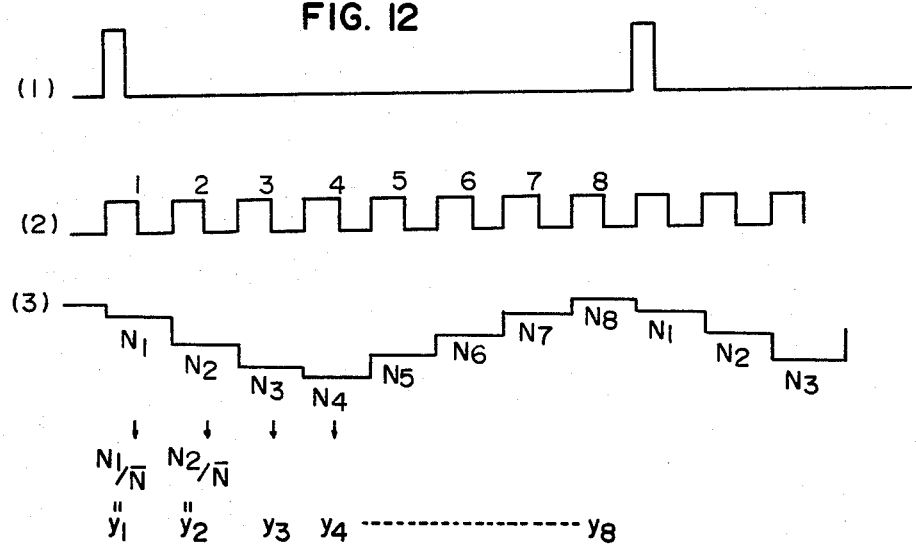
FIGS. 12(1, 2, 3) are diagrams illustrating signal waveforms according to still another embodiment of the present invention.

FIG. 12 is illustrative of a control process according to still another embodiment of the present invention. In FIG. 12, rotational angle signals (2) after each reference angle signal (1) are labeled as 1, 2, ..., 8, and instantaneous numbers of r.p.m. N1, N2, N3, ..., N8 are determined for the respective rotational angle signals. Speed reduction ratios y1, y2, ..., y8 with respect to the average number of r.p.m. N are calculated for the respective labeled rotational angle signals and then stored at memory addresses corresponding to the above labels. Then, $\theta/\theta o = k$ plus $\theta h$ is calculated and $yk+1$ corresponding to the label $k+1$ is read to correct the conversion of $\theta h$ into h.

The present invention has been described with particular reference to a diesel engine fuel injection control system using a solenoid-operated valve for spilling fuel. However, the present invention is also applicable to an electronic ignition timing control system for a gasoline engine using a reference angle signal and a rotational angel signal.

Although certain preferred embodiments of the present invention have been shown and described in detail, it should be understood that various changes and modifications may be made therein without departing from the scope of the appended claims.

What is claimed is:

1. A method of controlling an engine with a control signal produced at a angle phase of rotation of the engine and determined by a reference angle signal produced at a reference angle of rotation of the engine, and a rotational angle signal produced for each crank angle, comprising the steps of:
   (a) counting rotational angle signals produced after each reference angle signal before said angle phase is reached with any remainder angle smaller than said crank angle;
   (b) converting said remainder angle into a time based on an average number of r.p.m. of the engine at the time the conversion is effected;
   (c) issuing said control signal upon elapse of said counted rotational angle signals and said converted time;
   (d) determining a ratio of an instantaneous number of r.p.m. of the engine in the vicinity of said angle phase to an average number of r.p.m. of the engine; and
   (e) correcting the time converted from said remainder angle with said ratio.

2. A method according to claim 1, wherein said ratio is stored as a memory look-up table against the average number of r.p.m. of the engine.

3. A method according to claim 2, including the step of searching said look-up table for said ratio with respect to the average number of r.p.m. of the engine.

4. A method according to claim 1, including the steps of sucessively labeling the rotational angle signals between adjacent reference angle signals, determining instantaneous numbers of r.p.m. of the engine for the respective labeled rotational angle signals, calculating ratios of the instantaneous numbers of r.p.m. to the average numbers of r.p.m., and storing the ratios at respectively labeled memory addresses.

5. A method according to claim 1, wherein at least one of said rotational angle signals produced for each crank angle is used as said reference angle signal.

6. An apparatus for controlling an engine with a control signal produced at a angle phase of rotation of the engine, comprising:
   (a) first means for generating a reference angle signal at a reference angle of rotation of the engine;
   (b) second means for generating a rotational angle signal for each crank angle; and
   (c) a control unit for producing said control signal from said reference angle signal and said rotational angle signal, said control unit including means for counting rotational angle signals produced after each reference angle signal before said angle phase is reached with any remainder angle smaller than said crank angle, means for converting said remainder angle into a time based on an average number of r.p.m. of the engine at the time the conversion is effected, means for issuing said control signal upon elapse of said counted rotational angle signals and said converted time, means for determining a ratio of an instantaneous number of r.p.m. of the engine in the vicinity of said angle phase to an average number of r.p.m. of the engine, and means for correcting the time converted from said remainder angle with said ratio.

7. An apparatus according to claim 6, wherein said first and second means comprise a rotational angle sensor composed of a disk connected to an output shaft of the engine and having a plurality of spaced teeth on an outer peripheral surface of said disk, and a proximity detector placed adjacent to the outer peripheral surface, said teeth including a plurality of circumferentially equally spaced teeth greater than the other teeth.

* * * * *

UNITED STATES PATENT AND TRADEMARK OFFICE
CERTIFICATE OF CORRECTION

PATENT NO. : 4,642,773
DATED : February 10, 1987
INVENTOR(S) : Masahiko Miyaki and Tsuneyuki Egami It is certified that error appears in the above-identified patent and that said Letters Patent is hereby corrected as shown below:

ON THE TITLE PAGE, Item [73] should read

--Nippondenso Co., Ltd., Kariya;

Nippon Soken, Inc., Nishio; and

Toyota Jidosha Kabushiki Kaisha, Toyota-shi, all of

Japan , part interest. --.

Signed and Sealed this

Second Day of February, 1988

*Attest:*

DONALD J. QUIGG

*Attesting Officer*      *Commissioner of Patents and Trademarks*